United States Patent Office 3,616,530
Patented Nov. 2, 1971

3,616,530
METHOD OF FABRICATING A SUPERCONDUCTING COMPOSITE

Peter Francis Chester, Mollington, England, assignor to Imperial Metal Industries (Kynoch) Limited, Wittan, Birmingham, England No Drawing. Continuation of application Ser. No. 494,869, Oct. 11, 1965. This application Oct. 28, 1969, Ser. No. 871,969
Claims priority, application Great Britain, Nov. 20, 1964, 47,408/64
Int. Cl. H01v *11/00*
U.S. Cl. 29—599 5 Claims

ABSTRACT OF THE DISCLOSURE

A composite electrically conducting material suitable for carrying large currents comprises an array of Type I superconducting ribbons, layers or filaments in a matrix of normal material of high electrical and thermal conductivities. The superconducting material is preferably an alloy of niobium with titanium or zirconium and the normal material is conveniently copper, silver, aluminum, indium or cadmium.

CROSS REFERENCE TO RELATED APPLICATION

This application is a continuation of my application Ser. No. 494,869 filed Oct. 11, 1965, now abandoned and entitled "Magnets and Materials Therefor."

BACKGROUND OF THE INVENTION

(1) Field of the invention

This invention relates to magnets and is particularly concerned with materials for windings of electro-magnets arranged to operate with the windings at temperatures approaching absolute zero.

(2) Description of the prior art

The power consumed in conventional water-cooled copper windings for electromagnets in the 50 kilogauss range can run into many megawatts. There are two main ways of reducing this power consumption: (a) by refrigerating the windings to a temperature when their resistance is so drastically reduced that the power consumed in the windings together with that consumed by the refrigerator is less than with conventional copper at normal temperatures and, (b) by using superconducing windings at liquid helium temperatures. At least three superconducting materials are known to be able to carry lossless D.C. currents in the range $10^4$ to $10^5$ a./cm.$^2$ at fields of 50 kilogauss or above. Two of these are heavily cold worked alloys, niobium-zirconium (Nb-Zr) and a proprietary material known as HI.120 and produced by Westinghouse Electrical Corporation, Pittsburgh, Pa., U.S.A. The third is an intermetallic compound, Niobium-Tin. It has been the object of research on such materials to obtain the highest possible supercurrent density in the highest possible fields.

The physical mechanism of these materials is thought to be as follows. In the completely homogeneous, strain-free state, they are Type II superconductors, i.e. the electron coherence length is less than the depth of penetration of an applied magnetic field (see "Superconductivity" (1962) by E. A. Lynton). Type II superconductors in moderate magnetic fields allow flux to penetrate them in the form of quantised vortices (see articles by A. A. Abrikosov in Soviet Physics JETP 5, 1174 (1957) and in the Journal of The Physics and Chemistry of Solids, 199 (1957), thus reducing the free energy and allowing the superconducting state to persist to very high values of applied field—to the "upper critical field." (See "Superconductivity" (1962) by E. A. Lynton.) In the ideal condition such materials are not capable of carrying any useful impressed current (see R. A. Kamper Physics Letters 5, 9 (1963), and J. W. Heaton and A. C. Rose-Innes Physics Letters 9, 112 (1964). In order to achieve useful supercurrent densities, it is necessary to introduce into the material inhomogeneities of composition or strain which then act as "pinning centres" to stabilise the flux, and therefore the current against the displacing action of the Lorentz force $J \times H$ (see P. W. Anderson Physics Letters 9, 309 (1962), Kim et al. Physics Review 131, 2486 (1963)). Thus heavy cold working is necessary to bring out satisfactory current densities in Nb-Zr and HI.120. At present Nb-Zr and HI.120 are produced in wire form and it is necessary to draw down to 0.010″ diameter in order to introduce sufficient cold working. The overall yield in the production processes is low—of the order of 20%. Best results should be obtained when the spacing of the inhomogeneities matches that of the Abrikosov flux vortices, or vortex bundles (as explained by Anderson, above). However in conventional cold working processes, such as wire drawing, the micro-structure obtained has no regular arrangement and varies over a considerable range of size from point to point in the material. Clearly, this is a non-optimum situation.

When a current is passed through cold worked Type II superconductors, the Lorentz force is opposed by the restoring force exerted by the pinning centres. However, as the Lorentz force increases, the effective barrier height of the pinning centres is decreased and the probability of thermally activated motion of flux out of the pinning centre increases. The ultimate current limit is determined by the heating effect of this thermally activated flux motion across the current, together with the thermal diffusivity of the material—which is generally very poor. When the wire is wound into coils, and with niobium-tin even in short samples, this ultimate current limit is not attained ("degradation" effect) because of instabilities in the motion of flux (flux jumps) which result in instantaneously large local dissipation and local reversion to the non-superconducting state (quenching). It has been found empirically that plating the wire with copper or silver, to provide a low resistance alternative current path during flux jumps somewhat improves the coil performance of the wire.

A further feature of existing materials is that when wound into coils the critical current, and therefore maximum field, can be improved by repeatedly increasing the current through the coil until it quenches. This process is known as training. It does not usually remove the "degradation" effect.

There is growing evidence (see Applied Physics Letters 4, 206 (1964))) that large diamagnetism is associated with degradation and training. This is probably because the heat liberated by a given change in field is larger the larger the diamagnetism. A similar conclusion is reached from the standpoint of A.C. losses in hard superconductors. Now it is known that the heat generated in a changing field can be arbitrarily reduced by making that dimension of the superconductor which intersects the field sufficiently small.

Thus, one possible solution to the problem of degradation is to reduce the diameter of the superconducting wire to a very small value—much below the current 0.010″ diameter. In view of the difficulty of drawing these hard materials and of the present low yield in the drawing process this is not an attractive proposition—particularly for large magnets.

SUMMARY OF THE INVENTION

According to the present invention, there is provided a composite electrically conducting material comprising an array of superconducting ribbons, layers or filaments in a matrix of material (referred to hereinafter as the normal material) of high electrical and thermal conductivities. The array may comprise a multi-layer sandwich of alternate layers of superconducting and normal materials. The composite is preferably formed by rolling a stack of foils alternately of these materials. In some cases the material may be extruded before rolling. Instead of alternate layers of two materials, the composite may also be formed by plating or thin-film evaporation or a combination of these techniques. The superconductor in the formed composite is in intimate contact with a substantial volume of a good normal conductor, and such materials should be much easier to protect against burn-out in coils. Flux instabilities should be reduced due to the even distribution of flux and superconductor in the material. The superconducting material layers or ribbons can be formed extremely thin, so that diamagnetism of the finished material should be lower than that of materials formed by known methods, because of the thinness of the superconducting layers or ribbons. The low diamagnetism results in lower heat generation on change of field. Further advantages are the possibility of obtaining regular pinning structures of controlled orientation and with spacings selected to give maximum flux pinning. Rolling is faster than wire drawing and can produce material in widths much more suited to large magnets. The normal material should have high electrical and thermal conductivity at the low temperatures at which the other material is superconducting.

The normal material may be in the form of wires which are interleaved with foils of superconducting material before rolling or alternatively wires of superconducting material interleaved with foils of normal material.

The layers or ribbons of materials of the composite may be arranged non-parallel to the surfaces of the envelope to be rolled. The layers or ribbons may for example be arranged with their edges adjacent the surfaces to be rolled. The arrangement of the layers or ribbons is preferably varied along the length of the composite to suit the intended use of the material. The thicknesses of the layers across the composite may be graded to suit the intended use of the material.

The superconducting material is preferably niobium-titanium alloy, since alloys of these materials are most easily worked and have a high critical field.

After rolling, the material is preferably annealed. Such heat treatment is necessary to obtain reasonable conducting performance in alloys of niobium and titanium with more than 70 atomic percent titanium. The temperature of this annealing is such that no chemical reaction takes place between the constituents of the materials. If a niobium-titanium alloy is used with copper or aluminium, a temperature between 250° C. and 450° C. and typically between 300° C. and 400° C. might be employed.

Other materials can be used for the superconductor, for example niobium zirconium alloys or ternary or quaternary alloys including niobium and titanium or niobium and zirconium.

In one method of carrying the invention into practice, a multi-layer sandwich is made up of foils of superconducting and normal materials alternately. The superconducting material foils are preferably of niobium-titanium (Nb–Ti) for the reasons stated above and the normal material foils are conveniently of copper. However other superconducting materials may be used, and other normal materials such as silver or aluminium, or indium or cadmium may be used. Preferably the copper or other material is as pure as possible since, the higher the purity the better the performance of the composite.

Typically, a required number of foils are tightly packed in a suitably shaped box of a good normal conductor, such as copper or aluminium which box is then welded up or soldered in an inert atmosphere; the box is finally sealed off with vacuum or an inert atmosphere inside. Such a box is then preferably heated and passed hot, through rolls, at a temperature below that of any eutectic in the phase diagram of the components and the material of the box. The boxed sandwich is repeatedly rolled (the subsequent passes being not necessarily at above room temperature) until the thickness of the individual foils is reduced to the desired value. If it is desired to match the inhomogeneities to the flux bundle spacing in a high field, a layer or ribbon thickness of the order of 0.1 micron or less will be required. However, less rolling is required simply to reduce the diamagnetism to an acceptable level. It has been found possible, in a Nb-Ti/Cu composite of 40 layers to reduce the thickness of the Nb-Ti layers to about 2 microns. This composite was superconducting and carried useful currents in a field of 86 kgauss at 4.2° K. The proportions of normal conductor to superconductor can be varied over a wide range and it is possible to produce "dilute" materials (i.e. consisting mainly of good normal conductor) suitable for very large coils such as will be required for M.H.D. generators.

The structure just described is the simplest one and will still have an appreciable diamagnetism for fields perpendicular to the rolling plane. A further possible step to reduce this diamagnetism would be to assemble a large number of strips of such foil, say ½" wide, side by side on edge and then, with suitable support, roll these down until the ½" dimension is reduced to say 0.001". In this way a foil would be produced consisting of a matrix of good conductor threaded by a large number of fine superconducting ribbons or filaments no more than .001" in diameter. Such a material would have a very low diamagnetism. A further characteristic of such a material would be that its super-conducting properties would be isotropic even though it was produced by a rolling process which ordinarily would introduce anisotropy.

In all these processes it is not essential that the layers, ribbons or filaments remain continuous. The resistance between layers, ribbons or filaments via the very thin good conductor will certainly be very low due to the intimate contact of the layers and even if the resulting product is not strictly of zero resistance it will have a resistance so low that the power dissipation will be entirely acceptable in most large magnet applications. To improve the conductivity of the good conductor, and/or to improve the performance of the superconductor, the composite may be annealed or heat treated after fabrication. In this respect, aluminum is a good choice for the good conductor since it is known to anneal very well at 400° C. at which temperature there will be no reaction with the Nb-Ti.

In the case where the inhomogeneities are to be matched with the flux bundle spacing for use in a non-uniform field, the spacing of the layers or ribbons can be varied from one part of the composite material to another so that the optimum spacing for the field in which the material is to be used at any given point is maintained. It is also possible, by suitably assembling the foils before rolling the composite, to obtain layers or ribbons at an angle to the plane of the final strip so as to be suitable for the end windings of a magnet where there is a substantial component of field transverse to the plane of the strip. With some sacrifice in regularity, it is possible to contrive that the layers do not lie in planes at all but in corrugations, whirls or ripples so as always to present some pinning layers in the best direction to the field. One method of achieving this would be to stack simple or composite foils on edge not too tightly together so that when the composite is edge rolled some crushing takes place and a spectrum of orientations, all with much the same spacing, results.

It is also possible to contrive that the superconducting material is split up into separate ribbons or filaments by the process of rolling. Again, with suitable selection of the thicknesses of the component foils, a continually graded composite could be produced so that the pinning spacing varied across it to have the optimum value at each point.

The finished material may be up to several feet wide, such a width being suitable for large magnets. As the thickness is small (of the order of one thousandth of an inch), the current carrying capacity is still manageable. Such strips would be much better suited to the winding a large magnets than existing 0.010" diameter wire or even cable made from such wire. By use of rod rolling or other rolling techniques it is possible to produce sections other than thin strips, for example rectangular or circular sections, with areas of the order of one square centimetre. It is to be expected that the composite materials described will be cheaper to produce and have a better performance in coils than existing ductile wires. Although the composite materials will probably have lower short sample current densities than Nb-Zr or HI120, their degradation in coils is likely to be much less, so that in coils they should perform as well or better, volume for volume.

Because of the large proportion of good conductor that it is possible to incorporate, and the very intimate contact that it makes with the superconductor, the composite material should be very little affected by flux instabilities even if they should occur. Moreover, they should be much more easily protected against destructive burn out in large magnets.

The material as described above is suitable for use in magnet windings and the invention includes within its scope a magnet including such material.

DESCRIPTION OF THE PREFERRED EMBODIMENTS

The following is a description of two examples of the manner of carrying the invention into practice. Each of these examples is a method of making a composite electrically conducting material which may be used for a winding of a large electromagnet such as might be used in a magnetohydrodynamic electrical power generator.

In the first example, a sandwich is built up of about forty layers of foil; the layers are alternately copper and a niobium-titanium alloy containing 60 atomic percent titanium; this is an alloy which requires cold working. The foils are initially as thin as can conveniently be made and assembled. The sandwich assembly is vacuum sealed in a copper box which tightly encloses the sandwich and which is sealed by soldering. This box is heated to a temperature which is not critical provided it is below that of any eutectic in the niobium-titanium copper phase diagram and, whilst hot, is rolled in the plane of the foils to reduce the thickness of the niobium-titanium foils to about 0.001". The first rolling must be hot in order to obtain bonding; subsequent rolling can be done at room temperature. The resultant product is a length of composite foil. A large number of ½" wide strips of such foil are assembled together in parallel planes and then repeatedly rolled edgewise to reduce the thickness from ½" to about 0.001". This rolling produces a foil which may be several feet wide and which comprises a copper matrix threaded by a large number of fine filaments or ribbons of the niobium-titanium material. The material is then annealed at a temperature of 300° C. to 400° C. Provided the superconducting filaments are not ruptured, the material will have zero resistance. Even if the filaments are ruptured, the material would have a very low electrical resistance, and at a low temperature e.g. 4.2° K., can, as a magnet winding, carry a large current to give a field of many tens of kilogauss.

In the second example, a sheet of niobium-titanium material having 70 atomic percent titanium is formed with a plurality of parallel slots. This sheet and a superimposed sheet of copper are rolled up together, the slots being parallel to the axis of rolling. The assembly is then canned in a tightly fitting copper can which is sealed under vacuum. The assembly is then heated to a temperature below that of any eutectic in the niobium-titanium copper phase diagram, and, whilst hot, is first hot rolled along its axis and subsequently rolled cold to reduce the thickness of the assembly. The rolling is sufficient to make the portions of niobium-titanium material (which is divided by the slots) into filaments of less than 0.001" thickness. This alloy requires heat treatment after processing to develop good superconducting properties. The rolled material is therefore heat treated at a temperature between 250° C. and 450° C. to produce the required superconducting properties. The resulting product is a material which is superconducting at low temperatures and, when arranged as a magnet winding, can carry a large current to give a field of many tens of kilogauss.

In both the above examples, in which a niobium-titanium alloy which in titanium is employed, it has been found that the useful current density, which can be obtained as a superconducting electro-magnet, is dependent more on the heat treatment than on cold working. These alloys therefore are particularly well suited for integral composites.

I claim:

1. A method of making an electrically conducting composite comprising the steps positioning together a Type II superconductor material and a normal material of high electrical and thermal conductivities, and causing said materials to become metallurgically bonded together by mechanically hot and cold working said superposed materials, said mechanical working including a eutectic in the phase diagram of said materials and subsequent cold working whereby the superconductor material is deformed and distributed as an array of ribbons, filaments or layers in a matrix of said normal material.

2. The method of claim 1 wherein the superconductor is a niobium-titanium alloy.

3. The method of claim 2 wherein the normal material is copper.

4. The method of claim 3 wherein the composite material is heat treated at a temperature between 250° C. and 450° C.

5. The method of claim 4 wherein the superconductor is a niobium-titanium alloy with the titanium more than 70 atomic percent of the alloy.

References Cited

UNITED STATES PATENTS

| | | | |
|---|---|---|---|
| 3,109,963 | 11/1963 | Geballe | 335—216 X |
| 3,271,200 | 9/1966 | Zwicker | 335—216 X |
| 3,378,916 | 4/1968 | Robinson | 29—599 |
| 3,433,892 | 3/1969 | Ahmed El Bindari | 174—126 |
| 3,306,972 | 2/1967 | Laverick et al. | 174—126 C |
| 3,162,943 | 12/1964 | Wong | 29—599 |
| 3,437,459 | 4/1969 | Williams | 29—183.5 |
| 3,395,000 | 7/1968 | Hanak et al. | 29—194 |
| 3,303,065 | 2/1967 | Reynolds | 148—32 |

CHARLIE T. MOON, Primary Examiner

D. C. REILEY, Assistant Examiner

U.S. Cl. X.R.

174—126.2, DIG. 6; 335—216

PO-1050
(5/69)

UNITED STATES PATENT OFFICE

CERTIFICATE OF CORRECTION

Patent No. 3,616,530 Dated November 2, 1971

Inventor(s) Peter Francis Chester

It is certified that error appears in the above-identified patent and that said Letters Patent are hereby corrected as shown below:

Claim 1, line 7, (column 6, 39, of the patent) after "including" should be inserted --an initial hot working at a temperature below that of any--; "a" before "eutectic" should be deleted.

Signed and sealed this 18th day of April 1972.

(SEAL)
Attest:

EDWARD M.FLETCHER,JR.
Attesting Officer

ROBERT GOTTSCHALK
Commissioner of Patents